United States Patent
Cline et al.

(10) Patent No.: US 11,783,737 B2
(45) Date of Patent: Oct. 10, 2023

(54) CROWD TRAFFIC MANAGEMENT SYSTEM

(71) Applicant: Purdue Research Foundation, West Lafayette, IN (US)

(72) Inventors: Travis L Cline, West Lafayette, IN (US); Braiden M. Frantz, West Lafayette, IN (US); Krassimir Tzvetanov, West Lafayette, IN (US); James Eric Dietz, Lafayette, IN (US)

(73) Assignee: Purdue Research Foundation, West Lafayette, IN (US)

( * ) Notice: Subject to any disclaimer, the term of this patent is extended or adjusted under 35 U.S.C. 154(b) by 0 days.

(21) Appl. No.: 17/508,605

(22) Filed: Oct. 22, 2021

(65) Prior Publication Data

US 2022/0130293 A1    Apr. 28, 2022

Related U.S. Application Data

(60) Provisional application No. 63/104,349, filed on Oct. 22, 2020.

(51) Int. Cl.
| | | |
|---|---|---|
| *G09F 19/00* | (2006.01) | |
| *G09F 13/34* | (2006.01) | |
| *G01S 19/01* | (2010.01) | |
| *G09F 27/00* | (2006.01) | |
| *G09F 13/04* | (2006.01) | |

(52) U.S. Cl.
CPC ............ *G09F 19/008* (2021.05); *G01S 19/01* (2013.01); *G09F 13/0409* (2013.01); *G09F 13/34* (2013.01); *G09F 27/004* (2013.01); *G09F 27/005* (2013.01)

(58) Field of Classification Search
CPC .... G09F 13/0409; G09F 13/34; G09F 27/004; G09F 27/005; G01S 19/01
See application file for complete search history.

(56) References Cited

U.S. PATENT DOCUMENTS

| | | | | |
|---|---|---|---|---|
| 4,920,674 A | * | 5/1990 | Shaeffer | G09F 23/14 116/210 |
| 6,186,857 B1 | * | 2/2001 | Gazit | G09F 15/0025 40/406 |
| 10,830,229 B1 | * | 11/2020 | Lurker | F04B 35/04 |
| 11,276,337 B1 | * | 3/2022 | Yavruyan | E01F 13/022 |
| 2011/0030255 A1 | * | 2/2011 | Morris | G09F 15/005 40/610 |
| 2013/0008064 A1 | * | 1/2013 | Park | G09F 15/0087 40/603 |

* cited by examiner

*Primary Examiner* — Gary C Hoge
(74) *Attorney, Agent, or Firm* — Piroozi-IP, LLC

(57) ABSTRACT

A crowd management system (CMS), is disclosed which includes a command and control (C2) subsystem, a sensor network in communication with the C2 subsystem and adapted to provide signals corresponding to geographical number of individuals in a venue, and one or more crowd management devices (CMDs) further in communication with the C2 subsystem, each of the CMDs including a base adapted to release air at a high pressure, the base further including a positional device adapted to position the base according to a selective position, and an inflatable body terminating into a predefined shape adapted to convey a predefined message to individuals near the CMDs.

13 Claims, 4 Drawing Sheets

CROWD TRAFFIC MANAGEMENT SYSTEM

CROSS-REFERENCE TO RELATED APPLICATIONS

The present patent application is related to and claims the priority benefit of U.S. Provisional Patent Application Ser. No. 63/104,349, filed 22 Oct. 2020, entitled CROWD TRAFFIC MANAGEMENT SYSTEM, the contents of which are hereby incorporated by reference in its entirety into the present disclosure.

STATEMENT REGARDING GOVERNMENT FUNDING

None.

TECHNICAL FIELD

The present disclosure generally relates to a crowd traffic management system, and in particular, to a crows traffic management system in a venue.

BACKGROUND

This section introduces aspects that may help facilitate a better understanding of the disclosure. Accordingly, these statements are to be read in this light and are not to be understood as admissions about what is or is not prior art.

In various high patron density venues, an event resulting in the necessity of sudden exit from the venue of the patrons can pose significant challenges. For example, a terrorist attack, a sudden occurrence of severe inclement weather, a fire, an earthquake, etc., may result for the authorities of the venue to decide it is best for the patrons to exit the facilities as quickly as possible. Naturally, human tendencies may result in a less than optimal pattern of exit, resulting in delays, injuries, etc.

Previous simulations have shown that utilizing multiple exits in the event of an incident for a high-density event (HDE) result in faster evacuation times, and reduced emergency response time. However, directing individuals to these multiple exits can pose a challenge of its own. For example, in cases where some exits may be disproportionately loaded with pedestrians due to their proximity to major attractions, can result in a slower exit by the patrons while other nearby exists remain significantly underutilized.

Posting individuals at various checkpoints to direct crowds can be extremely costly. For example, a worker whose responsibility is to direct patrons in an emergency is woefully underutilized most of the time.

Therefore, there is an unmet need for a novel approach to provide traffic control for patrons in a HDE in case of an unforeseen event.

SUMMARY

A crowd management system (CMS), is disclosed. The CMS includes a command and control (C2) subsystem, a sensor network in communication with the C2 subsystem and adapted to provide signals corresponding to geographical number of individuals in a venue, and one or more crowd management devices (CMDs) further in communication with the C2 subsystem. Each of the CMDs including a base adapted to release air at a high pressure, the base further including a positional device adapted to position the base according to a selective position, and an inflatable body terminating into a predefined shape adapted to convey a predefined message to individuals near the CMDs.

An inflatable crowd management device (CMD) is also disclosed. The CMD includes a base adapted to release air at a high pressure, the base further including a positional device adapted to position the base according to a selective position, and an inflatable body terminating into a predefined shape adapted to convey a predefined message to individuals near the CMD.

A fixed crowd management device (CMD) is also disclosed. The CMD includes a base including a positional device adapted to position the base according to a selective position, and an extendable body terminating into a predefined shape adapted to convey a predefined message to individuals near the CMD.

DETAILED DESCRIPTION

Figure 1:
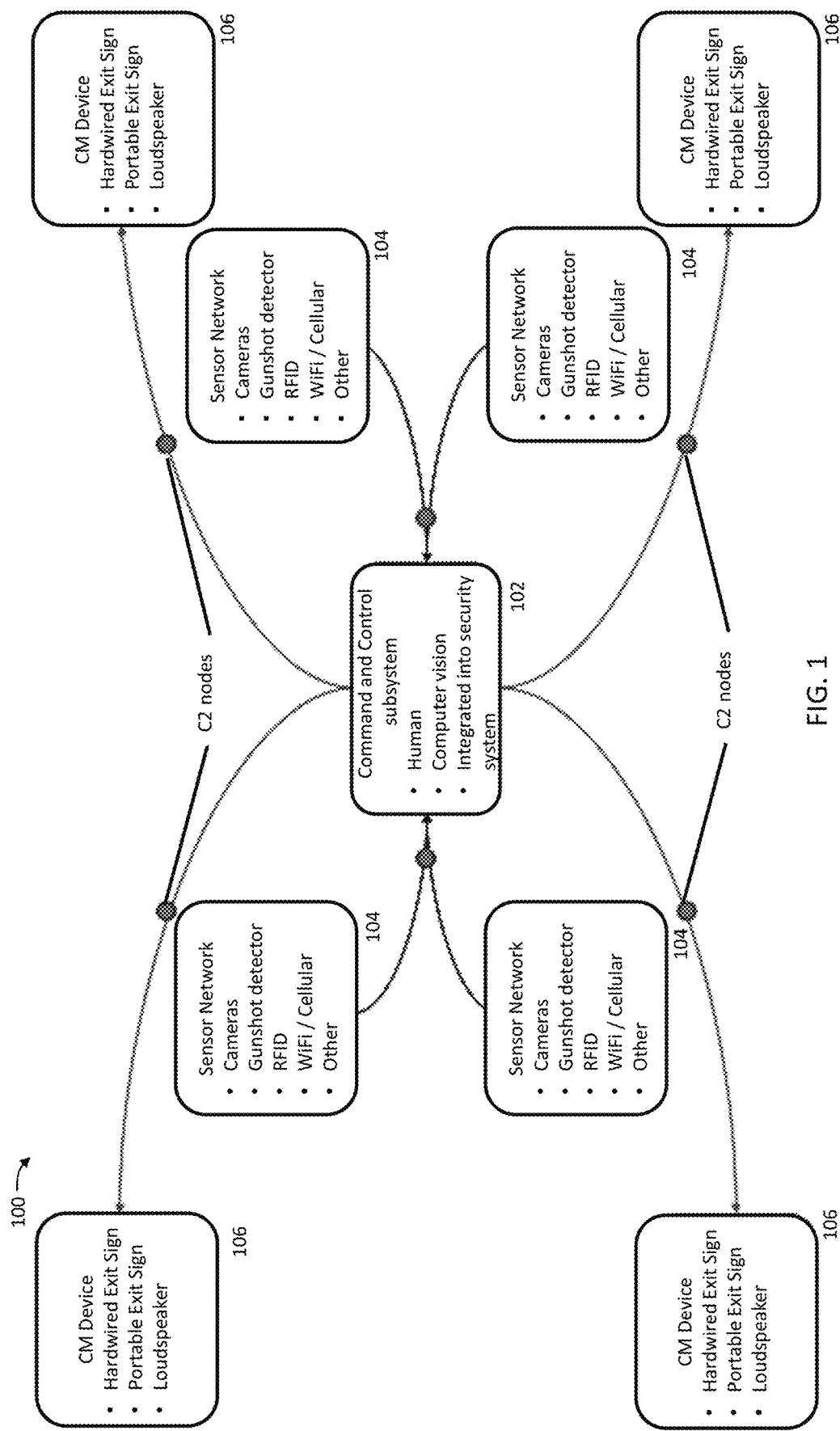
FIG. 1 is a schematic of a crowd management system (CMS) according to the present disclosure including one or more crowd management devices (CMDs).

For the purposes of promoting an understanding of the principles of the present disclosure, reference will now be made to the embodiments illustrated in the drawings, and specific language will be used to describe the same. It will nevertheless be understood that no limitation of the scope of this disclosure is thereby intended.

In the present disclosure, the term "about" can allow for a degree of variability in a value or range, for example, within 10%, within 5%, or within 1% of a stated value or of a stated limit of a range.

In the present disclosure, the term "substantially" can allow for a degree of variability in a value or range, for example, within 90%, within 95%, or within 99% of a stated value or of a stated limit of a range.

A novel approach is described to provide traffic control for patrons in a high-density event (HDE) in case of an unforeseen event. A modular Crowd Management System (CMS) is described adapted to monitor for hazardous situations in real time, as well as actively direct pedestrians away from danger, and toward exits. In a crowd traffic control system, crowd management devices (CMD) are devices which the system interacts with pedestrians and which includes networked smart signs, that inflate or extend and rotate to highlight the best route away towards exits. Signs are lit and clearly marked as to be easily understood at a glance and can be rotated in real-time to match the current state of the incident. A sensor network provides a computer-generated model of the HDE and feeds information to a processing center that communicates with the CMDs.

Signage is an important factor for any emergency situation involving densely populated areas. Strategically placed signs can direct patrons toward safety and reduce the risk of injury involved with a mass evacuation. The present disclosure provides an on-demand emergency evacuation signage system in high-density venues to keep patrons safe as they exit and guide people away from dangerous or overcrowded exits.

Thus, a modular crowd management system (CMS) 100 is described that may be in a fixed or deployable configuration and is used to direct pedestrian traffic in high-density events such as concerts, sports games, fairs, and amusement parks. The system would have several operational uses that contribute to the overall safety of the event in which it is employed. The CMS 100 of the present disclosure is made up of several modular components. The system includes three primary portions: 1) a command and control subsystem 102; 2) a sensor network 104; and 3) crowd management devices (CMDs) 106. Referring to FIG. 1, a schematic of an embodiment of the CMS according to the present disclosure is provided based on these subsystems. Each of these subsystems is described.

Command and Control Subsystem:

The command and control (C2) subsystem 102 includes a processing center including one or more processors which is adapted to receive data from various inputs and further adapted to control various outputs. In particular, the processing center receives data from a plurality of sensors distributed throughout the venue from which it can form a computer model of the venue in which the system is employed. This model includes a geographic representation of sensor data, traffic management devices, and exits. This computer model may include an approximation of the number of pedestrians per area, based on inputs it has received and processed from the various sensors. The processing center takes input from the sensors and send signals to the crowd management devices in the event of an incident, either manually, or automatically under control of software.

The C2 subsystem 102 is connected according to a mash or hub-and-spoke network, and primarily communicates wirelessly, through a wireless protocol selected from the group consisting of Zigbee, Bluetooth, Wi-Fi, GSM, BLE, and WiMax. The C2 subsystem 102 is adapted to automatically configure and to connect to all sensors of the sensor network 104 and CMDs 106. As a result the network is highly fault tolerant, if one or more of the sensors of the sensor network 104 were to fail.

Sensor Network

The sensor network 104 is adapted to monitor crowds for pedestrian count, density, movement, and behavior. Sensor data is aggregated at the C2 subsystem 102 to display a computer-generated representation of the event in real-time to provide situational awareness. Sensor data from the sensor network 104 is then used to feed the following into the C2 subsystem 102:

Pedestrian density broken up by area (unique to each event)
Pedestrian movement and behavior
Civil disturbance
Gunshot and explosion monitoring
General traffic patterns
Distressed individuals
Exit usage and flow
Location of safety hazards Towards this end, the sensor network 104 includes a variety of different sensors including video sensors (cameras including cameras equipped with infrared optical equipment); passive and active infrared and radio beams; pressure pads; cellphone emissions; and environmental sensors.

Video technology optionally combined with computer vision can track individuals over multiple cameras. As such, a video system can approximate count of individuals in a predefined area, or the number of individuals who have passed by a checkpoint. Additionally, the video could be recorded and saved for law enforcement investigations if necessary.

Passive and active IR can also be used for pedestrian count in predefined areas. A checkpoint type of deployment can be used, similar to a digital turn style. Breaking the beams of these sensors can be used to monitor entries and exits of an area or emergency exits.

Alternatively or in addition to, pressures pads can provide signals corresponding to the number of individuals standing on an area. While less accurate, it can provide a signal quickly commensurate with a large count of individuals.

Cell phone emissions can alternatively or in combination be used to determine crowd numbers and position. There are three types of cellphone emissions which can be useful in counting individuals in different areas in a venue. The first one, WiFi, allows patrons to gain access to the Internet without usage of cellular data. As an additional incentive, the venue may provide benefits, e.g., occasional coupons for purchase of items within the venue by voluntary connecting to the cell phones of the patrons. Alternatively or in addition to WiFi, the CMS 100 can track the presence of cell phones by passively monitoring their control channel communication with the cell phone towers. Alternatively or in addition thereto, Bluetooth signals can be used. Bluetooth emissions can be passively monitored. Cellphones routinely emit Bluetooth signals even if they are not connected to other Bluetooth devices. These signals can be monitored for unique devices and produce a relative count of devices in an area.

Still yet in an alternative or in combination therewith, environmental sensors can be used to sense sudden changes in environmental conditions. These sensors may include but are not limited to ambient temperature sensors, humidity sensors, flood/water sensors, inclement weather sensors, light sensors, gunshot and explosion detectors, smoke sensors, carbon-monoxide detectors, and explosive gas detectors.

Crowd Management Devices

The CMDs 106, according to the present disclosure, are those that are intended to change the behavior of a crowd in an incident to promote safe and orderly behavior. Crowd management devices can help direct pedestrians away from an active shooter, terrorist attack, or other hazardous event and efficiently direct them toward the nearest emergency exit, which may not otherwise be well known or labeled for outdoor events. The CMDs 106 can also be used as part of the CMS 100 to redirect evacuating pedestrians to less congested exits or pathways, thus minimizing the risk of trampling or crushing by actively monitoring pedestrian density and managing pedestrian traffic.

The CMDs 106 are physical signs of a novel design that may be rapidly deployable or fixedly positioned. The signs may optionally be equipped with loudspeakers to provide verbal interface, which may also be integrated into the venue public address system. These CMDs 106 are designed to be inconspicuous during normal operations but highly noticeable and directive in the event of an incident. Different embodiments of the CMDs are discussed, according to the present disclosure: 1) An inflatable sign in the shape of a column and arrow (see FIG. 2); and 2) a collapsible mast and placard style sign for events in which the inflatable signs are impracticable (see FIG. 3).

Figure 2:
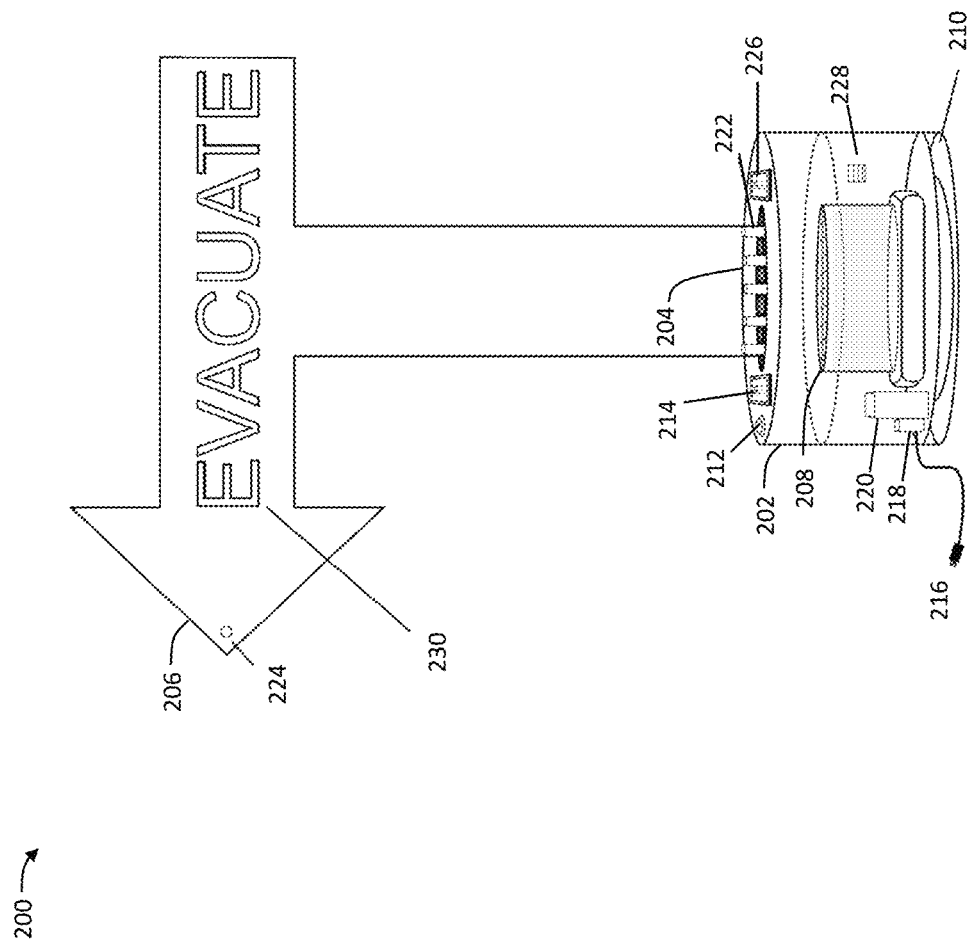
FIG. 2 is a front view of a CMD according to one embodiment of the present disclosure.

Referring to FIG. 2, a schematic of a CMD 200 according to one embodiment is provided. The CMD 200 includes a base 202. The base 202 has approximate dimensions of about 2 feet diameter cylinder with an opening 204 for connection to an inflatable sign 206. The base 202 includes a blower motor 208 or alternatively a compressed air storage tank (not shown) to rapidly inflate the inflatable sign 206. The base houses a turntable style electric or hydraulic turn-table motor 210 for the purpose of changing the orientation of the inflatable sign 206 to direct pedestrians away from an incident and toward an exit. The base 202 also includes a GPS receiver 212 optionally powered by a solar panel 214 or shore power to communicate precise location and orientation to the C2 subsystem 102. The CMD 200 may also be equipped with an external plug 216 that is capable of powering the entire CMD 200, as well as a battery charger 218 to convert the AC power to DC power for charging a battery 220.

The inflatable sign 206 has a large inflatable arrow oriented in the intended direction of crowd movement. The height of the CMD 200 with the inflatable sign 206 inflated at full deployment is between about 10 to about 15 feet. The inflatable sign 206 includes support material on both sides to offset the weight and thus add balance to the CMD 200. Standard marking 230 with "Evacuate" or other selective directive terms (e.g., by lighting the appropriate directive) are disposed on the arrow portion of the sign 206. The marking is made of reflective material for easier sight during low light conditions. Alternatively, the markings are provided as a large changeable display providing selective directives communicated from the C2 subsystem 102. LED lighting 222 in the form of one or more light emitting diodes (or other lighting sources) line the opening 204 to illuminate the inflatable sign 206 in appropriate colors (e.g., white light at nighttime), making it noticeable in an incident. A strobe light 224 is optionally added to the end of the inflatable sign 206 to help draw attention during daylight hours. Power for the strobe light 224 may originate from a dedicated battery (not shown), a wired connection to the battery 220 of the CMD 200, or wired from the external power by a wired connection to the external plug 216.

The embodiment shown in FIG. 2, powers the GPS receiver 212 and networking components (not shown) via the mounted solar panel(s) 214 on top of the base 202. The power from the solar panel(s) 214 charges the battery 220. The battery 220 is designed to operate the blower motor 208, the turn-table motor 210, the lighting (e.g., the LED lighting 222), and other auxiliary systems, such as a loudspeaker 226 for a short duration commensurate with evacuation or approximately 15-30 minutes. A network antenna 228 is also coupled to the base 202 allowing communication between the CMD 200 and the C2 subsystem 102.

Figure 3:
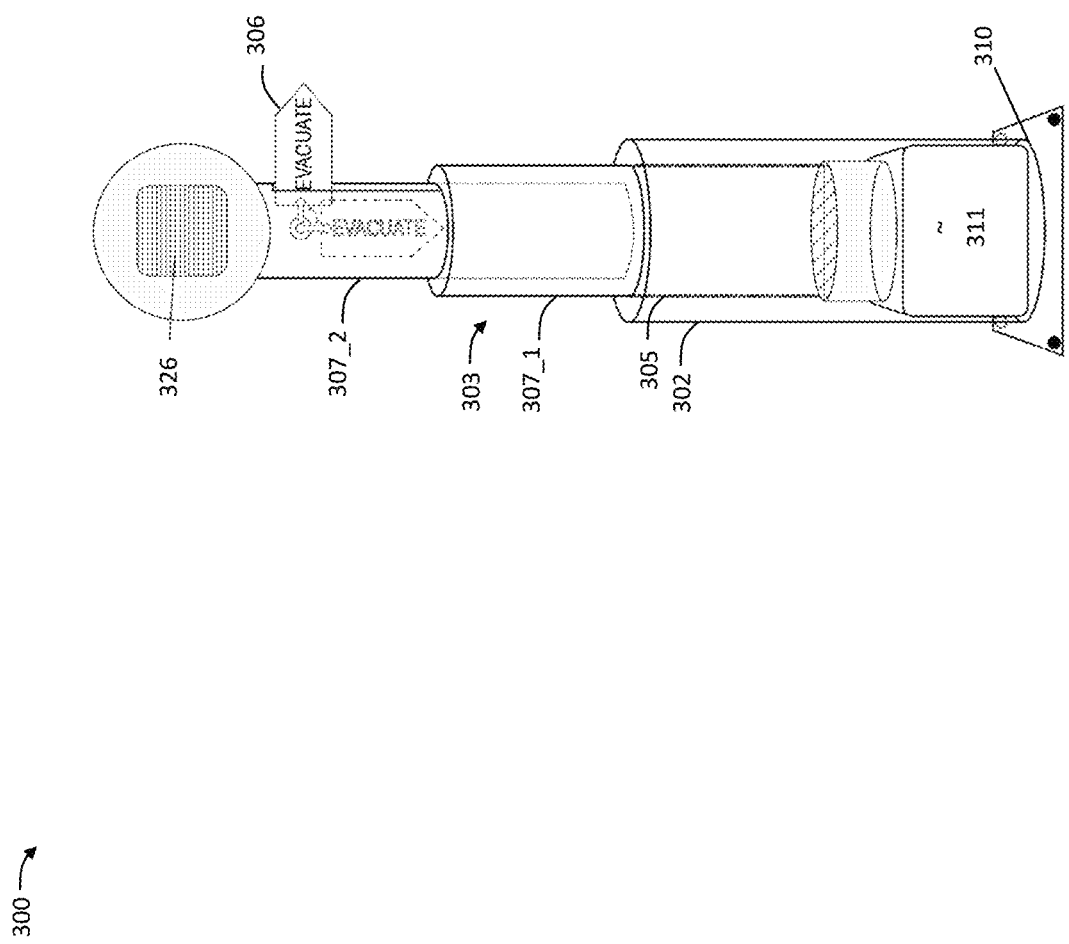
FIG. 3 is a front view of a CMD according to another embodiment of the present disclosure.

Another embodiment of a CMD 300 is shown in FIG. 3. The approximate dimensions for this style is about 96 inches at full extension. The CMD 300 includes a base 302. The base 302 houses a turntable style electric or hydraulic motor 310 to change the orientation of a sign 306 to direct pedestrians away from an incident and toward an exit. The base 302 includes a GPS receiver (not shown) and a magnetic direction sensor (not shown) powered by a solar panel (not shown) or shore power to communicate precise location and orientation of the sign 306 via the positioning of the motor 310 to the C2 subsystem 102. The CMD 300 also includes a mast 303 which has a base section 305 that is about 12 inches in diameter and about 48 inches in height. It is extendable to approximately about 96 inches of total height, with two incremental extensions 307_1 and 307_2 of each about 24 inches. The end of the mast 303 includes the rectangular arrow sign attached to the section 307_2, which rotates in a perpendicular direction as compared to the main axis (not shown) of the mast 303 when the mast 303 reaches its fully extended position. An electric motor 311 is provided and adapted to raise the mast 303 into its fully extended position. Standard marking with "Evacuate" or another directive term is on the rectangular arrow sign 306. The rectangular arrow sign 306 is equipped with color lights for lighting (green if the exit is permissible/safe or red if the exit is dangerous), with the light color controlled by the C2 subsystem 102. A small strobe light (not shown) is also affixed to the end of the arrow sign 306 to draw attention during daylight hours. The fixed CMD 300 is integrated into the facility power grid and receives its power therefrom. Auxiliary systems may also be added to match the needs of the venue or security team. These include a loudspeaker 326 with pre-recorded or messages provided from the C2 subsystem.

Figure 4:
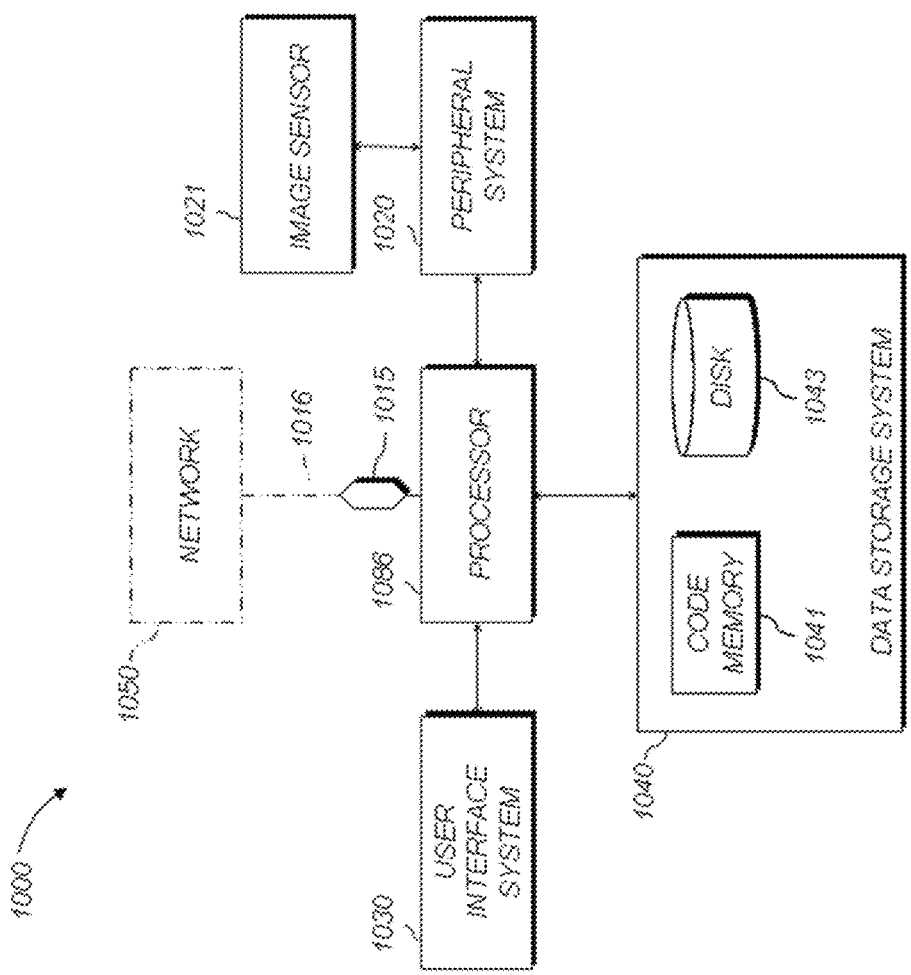
FIG. 4 is a high-level diagram showing the components of an exemplary data-processing system (also referred herein as the controller) for controlling various components of the CMS.

A controller 1000 is adapted to control the C2 subsystem 102. Referring to FIG. 4, an example of the controller 1000 is provided that can interface with the above-discussed elements of the CMS 100. Referring to FIG. 4, a high-level diagram showing the components of an exemplary data-processing system 1000 (also referred herein as Bernoulli controller) for analyzing data and performing other analyses described herein, and related components. The system includes a processor 1086, a peripheral system 1020, a user interface system 1030, and a data storage system 1040. The peripheral system 1020, the user interface system 1030 and the data storage system 1040 are communicatively connected to the processor 1086. Processor 1086 can be communicatively connected to network 1050 (shown in phantom), e.g., the Internet or a leased line, as discussed below. The imaging described in the present disclosure may be obtained using imaging sensors 1021 and/or displayed using display units (included in user interface system 1030) which can each include one or more of systems 1086, 1020, 1030, 1040, and can each connect to one or more network(s) 1050. Processor 1086, and other processing devices described herein, can each include one or more microprocessors, microcontrollers, field-programmable gate arrays (FPGAs), application-specific integrated circuits (ASICs), programmable logic devices (PLDs), programmable logic arrays (PLAs), programmable array logic devices (PALs), or digital signal processors (DSPs).

Processor 1086 can implement processes of various aspects described herein. Processor 1086 can be or include one or more device(s) for automatically operating on data, e.g., a central processing unit (CPU), microcontroller (MCU), desktop computer, laptop computer, mainframe computer, personal digital assistant, digital camera, cellular phone, smartphone, or any other device for processing data, managing data, or handling data, whether implemented with electrical, magnetic, optical, biological components, or otherwise. Processor 1086 can include Harvard-architecture components, modified-Harvard-architecture components, or Von-Neumann-architecture components.

The phrase "communicatively connected" includes any type of connection, wired or wireless, for communicating data between devices or processors. These devices or processors can be located in physical proximity or not. For example, subsystems such as peripheral system 1020, user interface system 1030, and data storage system 1040 are shown separately from the data processing system 1086 but can be stored completely or partially within the data processing system 1086.

The peripheral system 1020 can include one or more devices configured to provide digital content records to the processor 1086. For example, the peripheral system 1020 can include digital still cameras, digital video cameras, cellular phones, or other data processors. The processor 1086, upon receipt of digital content records from a device in the peripheral system 1020, can store such digital content records in the data storage system 1040.

The user interface system 1030 can include a mouse, a keyboard, another computer (connected, e.g., via a network or a null-modem cable), or any device or combination of devices from which data is input to the processor 1086. The user interface system 1030 also can include a display device, a processor-accessible memory, or any device or combination of devices to which data is output by the processor 1086. The user interface system 1030 and the data storage system 1040 can share a processor-accessible memory.

In various aspects, processor 1086 includes or is connected to communication interface 1015 that is coupled via network link 1016 (shown in phantom) to network 1050. For example, communication interface 1015 can include an integrated services digital network (ISDN) terminal adapter or a modem to communicate data via a telephone line; a network interface to communicate data via a local-area network (LAN), e.g., an Ethernet LAN, or wide-area network (WAN); or a radio to communicate data via a wireless link, e.g., WiFi or GSM. Communication interface 1015 sends and receives electrical, electromagnetic or optical signals that carry digital or analog data streams representing various types of information across network link 1016 to network 1050. Network link 1016 can be connected to network 1050 via a switch, gateway, hub, router, or other networking device.

Processor 1086 can send messages and receive data, including program code, through network 1050, network link 1016 and communication interface 1015. For example, a server can store requested code for an application program (e.g., a JAVA applet) on a tangible non-volatile computer-readable storage medium to which it is connected. The server can retrieve the code from the medium and transmit it through network 1050 to communication interface 1015. The received code can be executed by processor 1086 as it is received, or stored in data storage system 1040 for later execution.

Data storage system 1040 can include or be communicatively connected with one or more processor-accessible memories configured to store information. The memories can be, e.g., within a chassis or as parts of a distributed system. The phrase "processor-accessible memory" is intended to include any data storage device to or from which processor 1086 can transfer data (using appropriate components of peripheral system 1020), whether volatile or non-volatile; removable or fixed; electronic, magnetic, optical, chemical, mechanical, or otherwise. Exemplary processor-accessible memories include but are not limited to: registers, floppy disks, hard disks, tapes, bar codes, Compact Discs, DVDs, read-only memories (ROM), erasable programmable read-only memories (EPROM, EEPROM, or Flash), and random-access memories (RAMs). One of the processor-accessible memories in the data storage system 1040 can be a tangible non-transitory computer-readable storage medium, i.e., a non-transitory device or article of manufacture that participates in storing instructions that can be provided to processor 1086 for execution.

In an example, data storage system 1040 includes code memory 1041, e.g., a RAM, and disk 1043, e.g., a tangible computer-readable rotational storage device such as a hard drive. Computer program instructions are read into code memory 1041 from disk 1043. Processor 1086 then executes one or more sequences of the computer program instructions loaded into code memory 1041, as a result performing process steps described herein. In this way, processor 1086 carries out a computer implemented process. For example, steps of methods described herein, blocks of the flowchart illustrations or block diagrams herein, and combinations of those, can be implemented by computer program instructions. Code memory 1041 can also store data, or can store only code.

Various aspects described herein may be embodied as systems or methods. Accordingly, various aspects herein may take the form of an entirely hardware aspect, an entirely software aspect (including firmware, resident software, micro-code, etc.), or an aspect combining software and hardware aspects. These aspects can all generally be referred to herein as a "service," "circuit," "circuitry," "module," or "system."

Furthermore, various aspects herein may be embodied as computer program products including computer readable program code stored on a tangible non-transitory computer readable medium. Such a medium can be manufactured as is conventional for such articles, e.g., by pressing a CD-ROM. The program code includes computer program instructions that can be loaded into processor 1086 (and possibly also other processors), to cause functions, acts, or operational steps of various aspects herein to be performed by the processor 1086 (or other processors). Computer program code for carrying out operations for various aspects described herein may be written in any combination of one or more programming language(s), and can be loaded from disk 1043 into code memory 1041 for execution. The program code may execute, e.g., entirely on processor 1086, partly on processor 1086 and partly on a remote computer connected to network 1050, or entirely on the remote computer.

It should be appreciated that an appendix filed hereby is incorporated by reference in its entirety into the present disclosure. The Appendix (Appendix-A) is directed to a gunshot triangulation technology. This technology can be incorporated into a system including the CMDs 200 and 300 discussed above as well as a system which includes unmanned aerial vehicles. When position of a gunshot has been triangulated, that position can be used as a feedback signal to direct the unmanned vehicle in the vicinity of the position as well as use the same to direct patrons away from the position by orienting signs discussed in reference to FIGS. 2 and 3.

Those having ordinary skill in the art will recognize that numerous modifications can be made to the specific implementations described above. The implementations should not be limited to the particular limitations described. Other implementations may be possible.

The invention claimed is:

1. An inflatable crowd management device (CMD), comprising:
    a base adapted to release air at a high pressure, the base further including a positional device adapted to position the base according to a selective position,
    the base further comprising a communication device adapted to communicate one or more of orientation and position of the CMD; and
    an inflatable body terminating into a predefined shape adapted to convey a predefined message to individuals near the CMD.

2. The inflatable CMD of claim 1, the base further comprising a GPS sensor adapted to provide the position and the orientation of the CMD.

3. The inflatable CMD of claim 1, wherein the predefined message directs individuals to proceed in a selective direction.

4. The inflatable CMD of claim 1, further comprising a loudspeaker adapted to broadcast one or more of pre-recorded and selective messages.

5. The inflatable CMD of claim 1, further comprising a strobe light.

6. A crowd management system (CMS), comprising:
a command and control (C2) subsystem;
a sensor network in communication with the C2 subsystem and adapted to provide signals corresponding to geographical number of individuals in a venue; and
one or more crowd management devices (CMDs) further in communication with the C2 subsystem, each of the CMDs comprising:
a base adapted to release air at a high pressure, the base further including a positional device adapted to position the base according to a selective position; and
an inflatable body terminating into a predefined shape adapted to convey a predefined message to individuals near the CMDs.

7. The CMS of claim 6, the base further comprising a communication device adapted to communicate one or more of orientation and position of the CMD.

8. The CMS of claim 7, the base further comprising a GPS sensor adapted to provide the position and the orientation of the CMD.

9. The CMS of claim 6, wherein the predefined message directs individuals to proceed in a selective direction.

10. The CMS of claim 6, the CMD further comprising a loudspeaker adapted to broadcast one or more of pre-recorded and selective messages.

11. The CMS of claim 6, the CMD further comprising a strobe light.

12. The CMS of claim 6, the sensor network includes sensors selected from the group consisting of video sensors, passive and active infrared and radio beams, pressure pads, cellphone emissions, and environmental sensors.

13. The CMS of claim 6, the C2 subsystem communicates with the sensor network and CMDs via a wireless protocol selected from the group consisting of Zigbee, Bluetooth, Wi-Fi, GSM, BLE, and WiMax.

* * * * *